(12) United States Patent
Neelakantan et al.

(10) Patent No.: US 8,578,803 B2
(45) Date of Patent: Nov. 12, 2013

(54) SYNCHRONIZER ACTUATION ASSEMBLY

(75) Inventors: Vijay A. Neelakantan, Rochester Hills, MI (US); Bret M. Olson, Whitelake, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 547 days.

(21) Appl. No.: 12/841,702

(22) Filed: Jul. 22, 2010

(65) Prior Publication Data
US 2012/0017716 A1 Jan. 26, 2012

(51) Int. Cl.
*F16H 59/02* (2006.01)
(52) U.S. Cl.
USPC .................. 74/337.5; 74/473.1; 74/473.11
(58) Field of Classification Search
USPC ................ 74/335, 337.5, 473.11, 473.1
See application file for complete search history.

(56) References Cited

U.S. PATENT DOCUMENTS

| | | | |
|---|---|---|---|
| 1,821,194 A | 9/1931 | Wilcox | |
| 4,485,700 A | 12/1984 | Colvin | |
| 5,590,563 A * | 1/1997 | Kuwahata et al. | 74/337.5 |
| 5,868,035 A * | 2/1999 | Devaud | 74/337.5 |

* cited by examiner

*Primary Examiner* — William C Joyce

(57) ABSTRACT

A synchronizer actuation assembly for actuating at least one synchronizer member includes a barrel cam, at least one shift fork, a hydraulic piston assembly, and a motion converter. The barrel cam includes at least one cam groove that circumscribes the barrel cam and defines at least a neutral position and a first engaged position. The at least one shift fork has a first end portion disposed in the at least one cam groove and a second forked end portion. The hydraulic piston assembly includes a housing and a piston disposed in the housing. The motion converter includes a translatable input member engaged with the piston of the hydraulic piston assembly, a rotatable output member rotatably coupled with the barrel cam, and a direction selection mechanism. The translatable input member is selectively rotatably coupled with the rotatable output member in a first rotational direction or a second rotational direction.

11 Claims, 2 Drawing Sheets

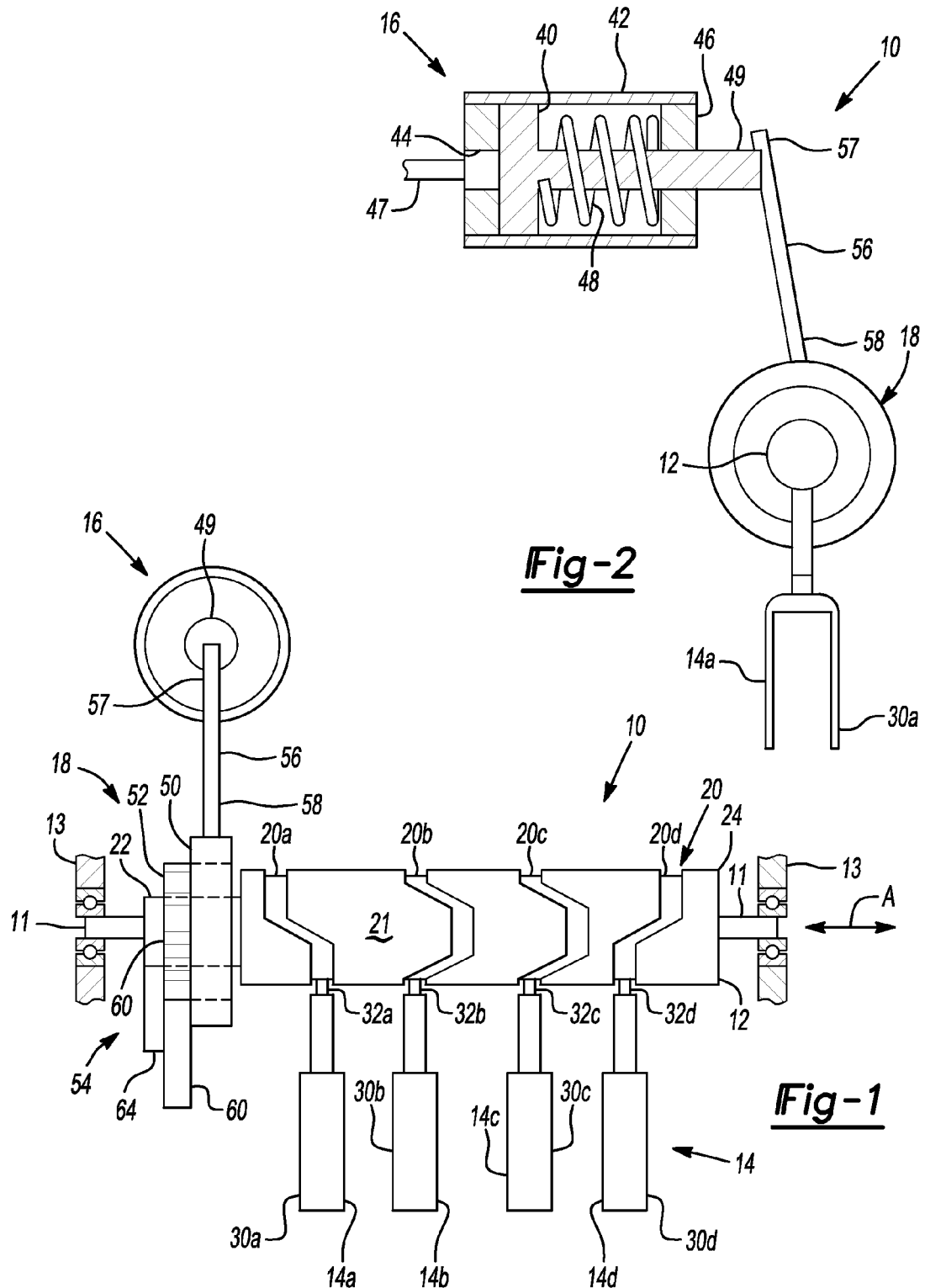

SYNCHRONIZER ACTUATION ASSEMBLY

TECHNICAL FIELD

The present disclosure relates to synchronizer assemblies, and more particularly to a hydraulically actuated synchronizer actuation assembly that includes a barrel cam.

BACKGROUND

The statements in this section merely provide background information related to the present disclosure and may or may not constitute prior art.

Automatic transmissions provide a plurality of forward and reverse speed or gear ratios by selectively actuating one or more brakes or clutches. Dual clutch transmissions have two input shafts and several countershaft gears with a different gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios. One type of synchronizer actuation system uses multiple pistons to control the synchronizer assembly. A sensor is often used for each piston utilized in the synchronizer actuation system, adding cost to the system.

While previous synchronizer actuation systems are useful for their intended purpose, the need for a lower cost synchronizer actuation system is essentially constant. Accordingly, there is a need for an improved, cost-effective synchronizer system for use in a dual clutch transmission.

SUMMARY

A synchronizer actuation assembly for actuating at least one synchronizer member includes a barrel cam, at least one shift fork, a hydraulic piston assembly, and a motion converter. The barrel cam includes at least one cam groove that circumscribes the barrel cam and defines at least a neutral position and a first engaged position. The at least one shift fork has a first end portion and a second end portion. The first end portion is disposed in the at least one annular groove of the barrel cam and the second end portion is forked. The hydraulic piston assembly includes a housing and a piston. The piston is disposed in the housing and is positionable between a first position and a second position. The motion converter includes a translatable input member engaged with the piston of the hydraulic piston assembly, a rotatable output member rotatably coupled with the barrel cam, and a direction selection mechanism. The translatable input member is selectively rotatably coupled with the rotatable output member and the direction selection mechanism has a first state and a second state. When the direction selection mechanism is in the first state, a movement of the piston to the right rotates the barrel cam in the first rotational direction while the return movement of the piston causes the direction selection mechanism to freewheel around the barrel cam. Similarly, when the direction selection mechanism is in the second state, a movement of the piston to the right causes the direction selection mechanism to freewheel around the barrel cam and the return movement of the piston to the left rotates the barrel cam in the second rotational direction.

In another example of the present invention, the housing of the hydraulic piston assembly includes a fluid port in hydraulic communication with a hydraulic circuit.

In yet another example of the present invention, the hydraulic piston assembly includes a biasing member that urges the piston to the first position.

In yet another example of the present invention, the biasing member is a coil spring disposed between the housing and the piston of the hydraulic piston assembly.

In yet another example of the present invention, the barrel cam has a plurality of equally spaced angular positions. Each of the angular positions has a unique arrangement of an axial position of the at least one cam groove. The axial position of each of the at least one cam groove is selected from a neutral position, a first engaged position, and an optional second engaged position for synchronizing gears in a vehicle transmission.

In yet another example of the present invention, the motion converter includes a selective direction one-way clutch.

In yet another example of the present invention, the translatable input member of the selective direction one-way clutch is an actuation member having a first end portion in translatable engagement with the piston and a second end portion engaged with a first race of the selective direction one-way clutch. The rotatable output member is a second race of the selective direction one-way clutch.

In yet another example of the present invention, the hydraulic piston assembly includes a first fluid port and a second fluid port each selectively hydraulically connectable with one of a fluid pressure source and a fluid exhaust. The first fluid port is proximate to a first end of the housing and the second fluid port is proximate to a second end of the housing of the hydraulic piston assembly.

In yet another example of the present invention, the motion converter includes a selective direction spiral ratchet assembly. The rotatable output member is a rotatable member having a pair of spiral grooves extending along a length of the rotatable member in opposing rotational directions.

In yet another example of the present invention, the selective direction spiral ratchet assembly includes a first nut and a second nut each selectively rotatably coupled to the translatable input member. The first nut is rotatably fixed with a first of the spiral grooves and the second nut is rotatably fixed with a second of the pair of spiral grooves. The translatable input member is rotationally stationary.

Further features, aspects, and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

FIG. 1 is a front view of an embodiment of a synchronizer actuation assembly according to the principles of the present invention;

FIG. 2 is a side and partial cross section view of the synchronizer actuation assembly shown in FIG. 1 according to the principles of the present invention;

DESCRIPTION

Figure 3:
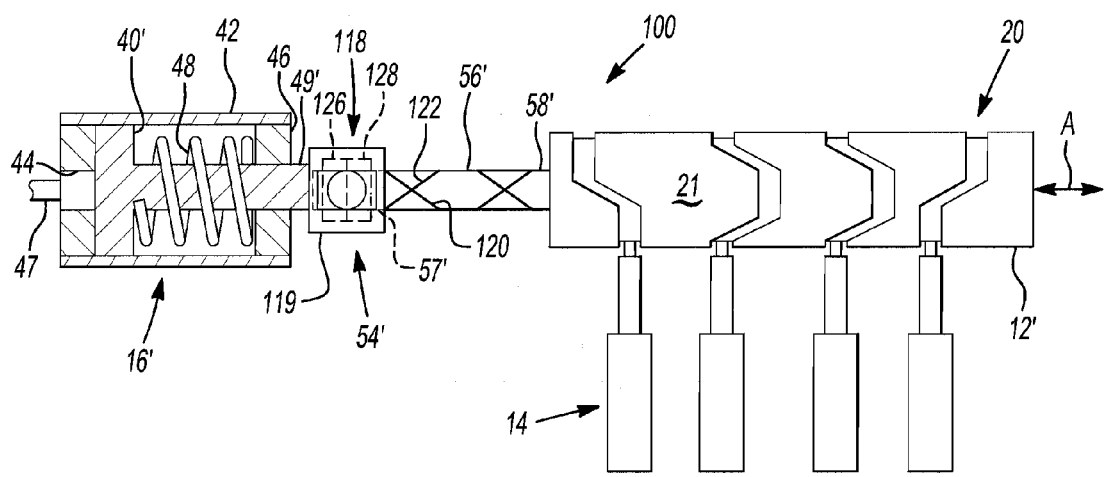
FIG. 3 is a front view of an embodiment of a synchronizer actuation assembly according to the principles of the present invention.

Referring to the drawings, wherein like reference numbers refer to like components, in FIGS. 1 and 2 a synchronizer actuation assembly 10 is illustrated in a front view and a side view in accordance with an embodiment of the present invention. The synchronizer actuation assembly 10 is disposed in a vehicle transmission having at least one gear that is selectively engaged with at least one shaft to provide a plurality of speed or gear ratios. The transmission generally includes a plurality of gear sets, a plurality of shafts, and a plurality of torque transmitting mechanisms to provide a plurality of speed or gear ratios. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission may vary without departing from the scope of the present disclosure. In the example provided, the synchronizer actuation assembly 10 is disposed in a dual-clutch transmission and is operable to selectively couple individual gears within the plurality of gear sets to the plurality of shafts.

The synchronizer actuation assembly 10 includes a shift drum or barrel cam 12, at least one shift fork 14, an actuator or hydraulic piston assembly 16, and a selective direction one-way clutch assembly 18 used as a motion converter. The barrel cam 12 is generally cylindrical in shape and includes at least one annular groove 20 that circumscribes an outer surface 21 of the barrel cam 12. The barrel cam 12 defines an axis "A" and is rotatable about the axis "A" in either rotational direction (i.e. clockwise or counterclockwise). The barrel cam 12 is supported by a rotatable shaft 11 and a pair of bearings 13 in the vehicle transmission. It should be appreciated that the barrel cam 12 may be supported in other locations by other suitable structures without departing from the scope of the present invention. The example provided includes four shift forks 14A-D and four grooves 20A-D that operate together to independently actuate four synchronizer members (not shown). Each of the grooves 20A-D corresponds to one of the plurality of shift forks 14A-D and has a configuration corresponding to a plurality of synchronizer actuation assembly 10 positions. It should be appreciated that any number of cam grooves 20 may be included on the barrel cam 12 which correspond to any number of shift forks 14 without departing from the scope of the present invention. The cam grooves 20A-D are configured to translate the shift forks 14A-D parallel to the A axis when the rotational position of the barrel cam 12 changes. It should be appreciated that the cam grooves 20A-D may have other configurations without departing from the scope of the present invention. An end portion 22 is coaxial with the main portion 24 and extends away from the main portion 24 along the A axis.

Each shift fork 14A-D is disposed either adjacent to certain single gears or between adjacent pairs of gears within adjacent gear sets of the transmission. Each of the shift forks 14A-D includes a forked portion 30A-D and a pin portion 32A-D, respectively. Each forked portion 30A-D engages a separate synchronizer sleeve (not shown) that rotatably couples one or two gears to a countershaft of the transmission using a positive clutch, such as a dog, face, or conical clutch. In the example provided, each synchronizer and shift fork 14A-D is bi-directionally translatable between a neutral position and a first engaged position. The shift forks 14A-D are additionally translatable to a second engaged position if the shift forks 14A-D selectively engage two gears independently with the shaft. Each shift fork 14A-D is disposed within the corresponding groove 20A-D to translate each shift fork 14A-D parallel to the A axis as the barrel cam 12 rotates. Each pin portion 32A-D has a dimension less than a width of the corresponding groove 20A-D in which the pin portion 32A-D is disposed. It should be appreciated that other numbers of shift forks 14 may be used according to the shifting requirements of the transmission incorporating the synchronizer actuation assembly 10. In an alternative embodiment, the pin portions 32A-D are roller bearings. It should be appreciated that the pin portion or roller bearings can be of various geometry and may be other mechanisms capable of traveling along the slot.

The hydraulic piston assembly 16 includes a piston 40, a cylinder 42, a fluid port 44, an end cap 46, and a resilient member or biasing member 48. The piston 40 is disposed inside the cylinder 42 and includes an end portion 49. The end portion 49 extends outside of the cylinder 42 to rotate the barrel cam 12 via the selective direction one way clutch assembly 18, as will be described below. The fluid port 44 is in hydraulic communication with a fluid passage 47 that selectively provides a hydraulic fluid to the hydraulic piston assembly 16. The end cap 46 is disposed within the cylinder 42 and encircles the end portion 49 of the piston 40. The biasing member 48 exerts a force on the piston 40 in the direction of the fluid port 44 to urge the piston 40 back to an initial position after an actuation event. In the example provided the biasing member 48 is a coil spring 48 disposed between the piston 40 and the end cap 46. The distanced traveled by the piston 40 and the hydraulic piston assembly 16 position are selected and pre-configured to rotate the barrel cam 12 by a predefined angle for each stroke of the piston 40. The predefined angle corresponds to a rotational angle between synchronizer states, as will be described below. It should be appreciated that the piston geometry and end caps may be of various designs without departing from the scope of the invention.

The selective direction one-way clutch assembly 18 includes a first race 50, a second race 52, a selector mechanism 54, and an actuation member 56. The second race 52 is rotatably coupled to the end portion 22 of the barrel cam 12. The first race 50 opposes the second race 52 and is coupled with the actuation member 56. The actuation member 56 has a first end portion 57 and a second end portion 58. The first end portion 57 is connected with the end portion 49 of the piston 40 and the second end portion 58 is coupled to the first race 50. In the example provided the end portion 49 is connected to the first end portion 57 by a pin (not shown) on the end portion 49 that slides in a groove (not shown) in the first end portion 57. The selector mechanism 54 changes the direction of torque transfer in the clutch assembly 18. The example provided includes a selector mechanism 54 which includes a toothed gear 60 rotatably coupled with the second race 52 and a bi-directional pawl 62 radially aligned with the toothed gear 60. The pawl 62 is rotatable on an axis that is rotatably coupled with the first race 50. The toothed gear 60 and the pawl 62 are selectively engaged to prevent rotation of the toothed gear 60 with respect to the pawl 62 in one direction or the other depending upon the position of the pawl 62. A tab 64 on the pawl 62 permits rotation of the pawl 62 about the pawl axis to change the direction of locking the races 50, 52 against rotation. Engagement of the pawl 62 with the toothed gear 60 is provided by a spring biaser (not shown) that provides a preferred means for preventing relative rotation of the races 50, 52 in one direction or the other while permitting rotation of the races 50, 52 in the opposite direction by ratcheting of the pawl 62. It should be appreciated that other types of selector mechanisms 54 may be used to select the direction of torque transfer in the clutch assembly 18. The selector mechanism 54 may be actuated by any suitable means, such as hydraulic or electromechanical actuation.

With continued reference to FIGS. 1 and 2, the rotation of the barrel cam 12 by the hydraulic piston assembly 16 will now be described. Pressurized hydraulic fluid from the fluid passage 47 enters the fluid port 44 of the hydraulic piston assembly 16. The hydraulic fluid exerts a force on the piston 40, urging the piston to move towards the end cap 46. The end portion 49 of the piston 40 urges the first end portion 57 of the actuation member 56 away from the hydraulic piston assembly 16. The second end portion 58 exerts a force on the first race 50 of the clutch assembly 18 that rotates the first race 50 in a first rotational direction. When the tab 64 is positioned to transmit torque in the first rotational direction, the first race 50 transmits torque to the toothed gear 60, which transmits torque to the pawl 62. The second race 52 transmits torque to the end portion 22 of the barrel cam 12 to urge the end portion 22 in the first rotational direction. The end portion 22 rotates the barrel cam 12 and the grooves 20A-D change the actuation state of at least one of the shift forks 14A-D. When the tab 64 is positioned to allow rotation in the first rotational direction, the toothed gear 60 ratchets with respect to the pawl 62 and the first race 50 rotates in the first rotational direction with respect to the second race 52.

When the pressurized hydraulic fluid is no longer provided to the fluid port 44 the spring 48 urges the piston 40 back away from the end cap 46. The end portion 49 of the piston 40 is connected to the first end portion 57 of the actuation member 56 and urges the first end portion 57 towards the hydraulic piston assembly 16. The second end portion 58 exerts a force on the first race 50 of the clutch assembly 18 that rotates the first race 50 in a second rotational direction that is opposite the first rotational direction. When the tab 64 is positioned to transmit torque in the second rotational direction, the first race 50 transmits torque to the toothed gear 60, which transmits torque to the pawl 62. The second race 52 transmits torque to the end portion 22 of the barrel cam 12 to urge the end portion 22 in the second rotational direction. The end portion 22 rotates the barrel cam 12 and the grooves 20A-D change the actuation state of at least one of the shift forks 14A-D. When the selector mechanism 54 is positioned to transmit torque in the first rotational direction, the toothed gear 60 ratchets with respect to the pawl 62 and the first race 50 rotates in the second rotational direction with respect to the second race 52. In the embodiment described a single stroke of the piston 40 rotates the barrel cam 12 by a predetermined amount corresponding to a single change in the synchronizer state. For example, if the synchronizer is in a state where a gear for a first speed ratio and a gear for a second speed ratio are each rotatably coupled to separate countershafts, a single stroke of the piston 40 may rotatably decouple the gear for the first speed ratio from the countershaft and rotatably couple a gear for a third gear ratio to the countershaft.

Turning now to FIG. 3, an example of a synchronizer actuation assembly 100 is shown in accordance with the principles of the present invention. The synchronizer actuation assembly 100 is similar to the synchronizer actuation assembly 10 and like numbers refer to like components. The synchronizer actuation assembly 100 includes a spiral ratchet assembly 118 that replaces the motion converter 18 and an actuation assembly 16' that replaces the actuation assembly 16. The spiral ratchet assembly 118 is, in the example provided, a push type or spiral ratchet assembly motion converter. The actuation assembly 16' includes a piston 40' having an end portion 49' engaged with a selector mechanism 54'. The piston 40' is aligned to translate on the axis A of the barrel cam 12'. The selector mechanism 54' has a first state and a second state to select the direction of rotation of the barrel cam 12' during actuation of the actuation assembly 16'. A translatable input member or housing 119 of the selector mechanism 54' is rotationally stationary and is in translatable engagement with the end portion 49' of the piston 40'. A rotatably output member or actuation member 56' includes a first end 57', a second end 58', a first spiral groove 120, and a second spiral groove 122. The first end 57' is disposed within the selector mechanism 54' and the second end 58' is rotatably coupled to the barrel cam 12'. The spiral grooves 120, 122 extend around the circumference of the actuation member 56' in opposite directions as they extend from the first end 57' to the second end 58'. A first nut 126 includes a projection (not shown) disposed in the first spiral groove 120 and a second nut 128 includes a projection (not shown) disposed in the second spiral groove 122. The nuts are in translatable engagement with and are each selectively rotatably coupled to the housing 119 by the selector mechanism 54' and a ratchet assembly for one-way torque transmission (not shown). It should be appreciated that other types of spiral ratchet assemblies may be used without departing from the scope of the present invention.

With continued reference to FIG. 3, an actuation event of the actuation assembly 16' will now be described. Pressurized hydraulic fluid from the fluid passage 47 enters the fluid port 44 of the hydraulic piston assembly 16'. The hydraulic fluid exerts a force on the piston 40', urging the piston to move towards the end cap 46. The end portion 49' of the piston 40' urges the housing 119 towards the barrel cam 12'. The housing 119 urges the nuts 126, 128 towards the barrel cam 12' and the spiral grooves 120, 122 rotate the nuts in opposite rotational directions. When the selector mechanism 54' is in the first state the first nut 126 is rotatably coupled to the housing 119 in the second rotational direction. The housing 119 exerts a torque on the first nut 126 and the projection of the first nut 126 exerts a torque on the spiral groove 120 of the actuation member 54'. The actuation member 54' transmits the torque to the barrel cam 12' and the barrel cam 12' rotates in the first rotational direction. When the selector mechanism 54' is in the second state the second nut 128 is rotatably coupled to the housing 119 in the first rotational direction. The housing 119 exerts a torque on the second nut 128 and the projection of the second nut 128 exerts a torque on the spiral groove 122 of the actuation member 54'. The actuation member 54' transmits the torque to the barrel cam 12' and the barrel cam 12' rotates in the second rotational direction. When the pressurized hydraulic fluid is no longer provided to the fluid port 44 the spring 48 urges the piston 40' back away from the end cap 46 to prepare for a new actuation event. The ratchet assembly allows the nuts 126, 128 to rotate back to an original position without transmitting torque from the housing 119 to the actuation member 54'.

Figure 4:
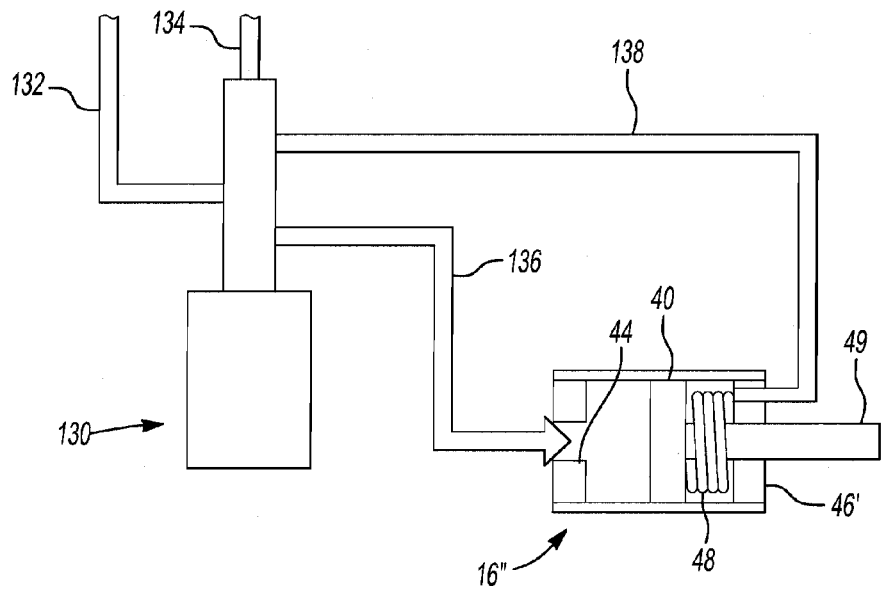
FIG. 4 is a front view of an embodiment of a synchronizer actuation assembly hydraulic circuit according to the principles of the present invention.

Turning now to FIG. 4, an example of a hydraulic piston assembly 16" is shown in accordance with an embodiment of the present invention. The hydraulic piston assembly 16" is similar to the hydraulic piston assembly 16 and like numbers refer to like components. A four port solenoid valve 130 is in hydraulic communication with a pressurized line 132, an exhaust line 134, a first fluid passage 136, and a second fluid passage 138. The solenoid valve 130 selectively connects the pressurized line 132 with one of the fluid passages 136, 138 and the exhaust line 134 with the other of the fluid passages 136, 138. The pressurized line 132 is in hydraulic communication with a pressure source such as a valve body and fluid pump of the transmission. The exhaust line 134 is in hydraulic communication with a fluid collection mechanism, such as a sump of a transmission. Those familiar with the art will recognize that in alternative embodiments the four port valve may be replaced with multiple valve and solenoid arrangements.

To provide a forward stroke of the piston 40, a transmission control module commands the solenoid valve 130 to put the pressurized line 132 in hydraulic communication with the first fluid passage 136 and the exhaust line 134 in hydraulic communication with the second fluid passage 138. The hydraulic fluid in the pressurized line 132 acts on the piston 40' which urges the actuation member 56 away from the fluid port 44. The biasing member 48 urges the piston 40 back into a first position or initial state when the transmission control module commands the solenoid valve 130 to put the first fluid passage 136 in hydraulic communication with the exhaust line 134. To rotate the barrel cam in the opposite rotational direction, the piston 40 is first put in a second position adjacent to the end cap 46. The solenoid valve 130 then puts the second fluid passage 138 in hydraulic communication with the pressurized line 132 and the first fluid passage 136 in hydraulic communication with the exhaust line 134. It should be appreciated that the spring 48 is included in a preferred embodiment to return the piston 40 to a default state, however the spring 48 may be omitted without departing from the scope of the present invention.

The present invention provides actuation of multiple synchronizers by using a single hydraulic piston assembly. The use of a single piston assembly reduces the number of piston position sensors and hydraulic circuits needed relative to a multiple hydraulic piston configuration.

The description of the invention is merely exemplary in nature and variations that do not depart from the general essence of the invention are intended to be within the scope of the invention. Such variations are not to be regarded as a departure from the spirit and scope of the invention.

The invention claimed is:

1. A synchronizer actuation assembly for actuating at least one synchronizer member, the synchronizer actuation assembly comprising:
    a barrel cam including at least one cam groove that circumscribes the barrel cam and defines at least a neutral position and a first engaged position, wherein the barrel cam is rotatable in a first rotational direction and a second rotational direction;
    at least one shift fork having a first end portion and a second end portion, wherein the first end portion is disposed in the at least one annular groove of the barrel cam and the second end portion is forked for controlling the synchronizer member;
    a hydraulic piston assembly including a housing and a piston, wherein the piston is disposed in the housing and is positionable between a first position and a second position; and
    a motion converter including a translatable input member engaged with the piston of the hydraulic piston assembly, a rotatable output member rotatably coupled with the barrel cam, and a direction selection mechanism attached to the rotatable output member, wherein the translatable input member is selectively rotatably coupled with the rotatable output member, and wherein the direction selection mechanism has a first state and a second state, and
    wherein a movement of the piston rotates the barrel cam in the first rotational direction when the direction selection mechanism is in the first state, and wherein a movement of the piston rotates the barrel cam in the second rotational direction when the direction selection mechanism is in the second state.

2. The synchronizer actuation assembly of claim 1, wherein the housing of the hydraulic piston assembly includes a fluid port in hydraulic communication with a hydraulic circuit.

3. The synchronizer actuation assembly of claim 1, wherein the barrel cam has a plurality of equally spaced angular positions, and wherein each of the angular positions has a unique arrangement of an axial position of the at least one cam groove, and wherein the axial position of each of the at least one cam groove is selected from a neutral position, a first engaged position, and a second engaged position for synchronizing gears in a vehicle transmission.

4. The synchronizer actuation assembly of claim 3, wherein a rotation angle between each of the angular positions is selected to correspond to a single translation of the piston between the first position and the second position.

5. The synchronizer actuation assembly of claim 1, wherein the motion converter includes a selective direction spiral ratchet assembly, and wherein the rotatable output member is a rotatable member having a pair of spiral grooves extending along a length of the rotatable member in opposing rotational directions.

6. The synchronizer actuation assembly of claim 5, wherein the selective direction spiral ratchet assembly includes a first nut and a second nut each selectively rotatably coupled to the translatable input member, and wherein the first nut is rotatably fixed with a first of the spiral grooves and the second nut is rotatably fixed with a second of the pair of spiral grooves, and wherein the translatable input member is rotationally stationary.

7. A synchronizer actuation assembly for actuating at least one synchronizer member, the synchronizer actuation assembly comprising:
    a barrel cam including at least one cam groove that circumscribes the barrel cam and defines at least a neutral position and a first engaged position, wherein the barrel cam is rotatable in a first rotational direction and a second rotational direction;
    at least one shift fork having a first end portion and a second end portion, wherein the first end portion is disposed in the at least one annular groove of the barrel cam and the second end portion is forked for controlling the synchronizer member;
    a hydraulic piston assembly including a housing and a piston, wherein the piston is disposed in the housing and is positionable between a first position and a second position; and
    a motion converter including a translatable input member engaged with the piston of the hydraulic piston assembly, a rotatable output member rotatably coupled with the barrel cam, and a direction selection mechanism, wherein the translatable input member is selectively rotatably coupled with the rotatable output member, and wherein the direction selection mechanism has a first state and a second state, and
    wherein a movement of the piston rotates the barrel cam in the first rotational direction when the direction selection mechanism is in the first state, and wherein a movement of the piston rotates the barrel cam in the second rotational direction when the direction selection mechanism is in the second state wherein the hydraulic piston assembly includes a biasing member that urges the piston to the first position.

8. The synchronizer actuation assembly of claim 7, wherein the biasing member is a spring disposed between the housing and the piston of the hydraulic piston assembly.

9. A synchronizer actuation assembly for actuating at least one synchronizer member, the synchronizer actuation assembly comprising:
  a barrel cam including at least one cam groove that circumscribes the barrel cam and defines at least a neutral position and a first engaged position, wherein the barrel cam is rotatable in a first rotational direction and a second rotational direction;
  at least one shift fork having a first end portion and a second end portion, wherein the first end portion is disposed in the at least one annular groove of the barrel cam and the second end portion is forked for controlling the synchronizer member;
  a hydraulic piston assembly including a housing and a piston, wherein the piston is disposed in the housing and is positionable between a first position and a second position; and
  a motion converter including a translatable input member engaged with the piston of the hydraulic piston assembly, a rotatable output member rotatably coupled with the barrel cam, and a direction selection mechanism, wherein the translatable input member is selectively rotatably coupled with the rotatable output member, and wherein the direction selection mechanism has a first state and a second state, and
  wherein a movement of the piston rotates the barrel cam in the first rotational direction when the direction selection mechanism is in the first state, and wherein a movement of the piston rotates the barrel cam in the second rotational direction when the direction selection mechanism is in the second state wherein the motion converter includes a selective direction one-way clutch.

10. The synchronizer actuation assembly of claim 9, wherein the translatable input member of the selective direction one-way clutch is an actuation member having a first end portion in translatable engagement with the piston and a second end portion engaged with a first race of the selective direction one-way clutch, and wherein the rotatable output member is a second race of the selective direction one-way clutch.

11. The synchronizer actuation assembly of claim 9, wherein the hydraulic piston assembly includes a first fluid port and a second fluid port each selectively hydraulically connectable with one of a fluid pressure source and a fluid exhaust, and wherein the first fluid port is proximate to a first end of the housing and the second fluid port is proximate to a second end of the housing of the hydraulic piston assembly.

* * * * *